United States Patent [19]
Buchner
[11] 3,729,592
[45] Apr. 24, 1973

[54] TELECOMMUNICATION SYSTEM

[75] Inventor: Robert Bertold Buchner, Hilversum, Netherlands

[73] Assignee: U.S. Philips Corporation, New York, N.Y.

[22] Filed: Jan. 8, 1971

[21] Appl. No.: 105,022

[30] Foreign Application Priority Data

Jan. 13, 1970 Netherlands ........................7000394

[52] U.S. Cl. ..............................................179/18 FC
[51] Int. Cl. ..............................................H04q 3/42
[58] Field of Search......................179/18 FC, 18 EA, 179/18 E, 18 C

[56] References Cited

UNITED STATES PATENTS

| | | | |
|---|---|---|---|
| 3,496,301 | 2/1970 | Kaenel | 179/18 FC X |
| 3,573,386 | 4/1971 | Thompson | 179/18 FC |

*Primary Examiner*—William C. Cooper
*Attorney*—Frank R. Trifari

[57] ABSTRACT

Telecommunication system comprising a transit exchange and a local exchange connected thereto through a group of junction lines, in which at the reception of an incoming call from the transit exchange which is intended for a subscriber line connected to the local exchange, a connecting channel is established in the local exchange between the called subscriber line and an arbitrary free junction line of said group and the identification of this junction line is transferred to the transit exchange, in which subsequently a connecting channel is established from the line from which the said call originated to said junction line.

1 Claim, 2 Drawing Figures

Figure 1:
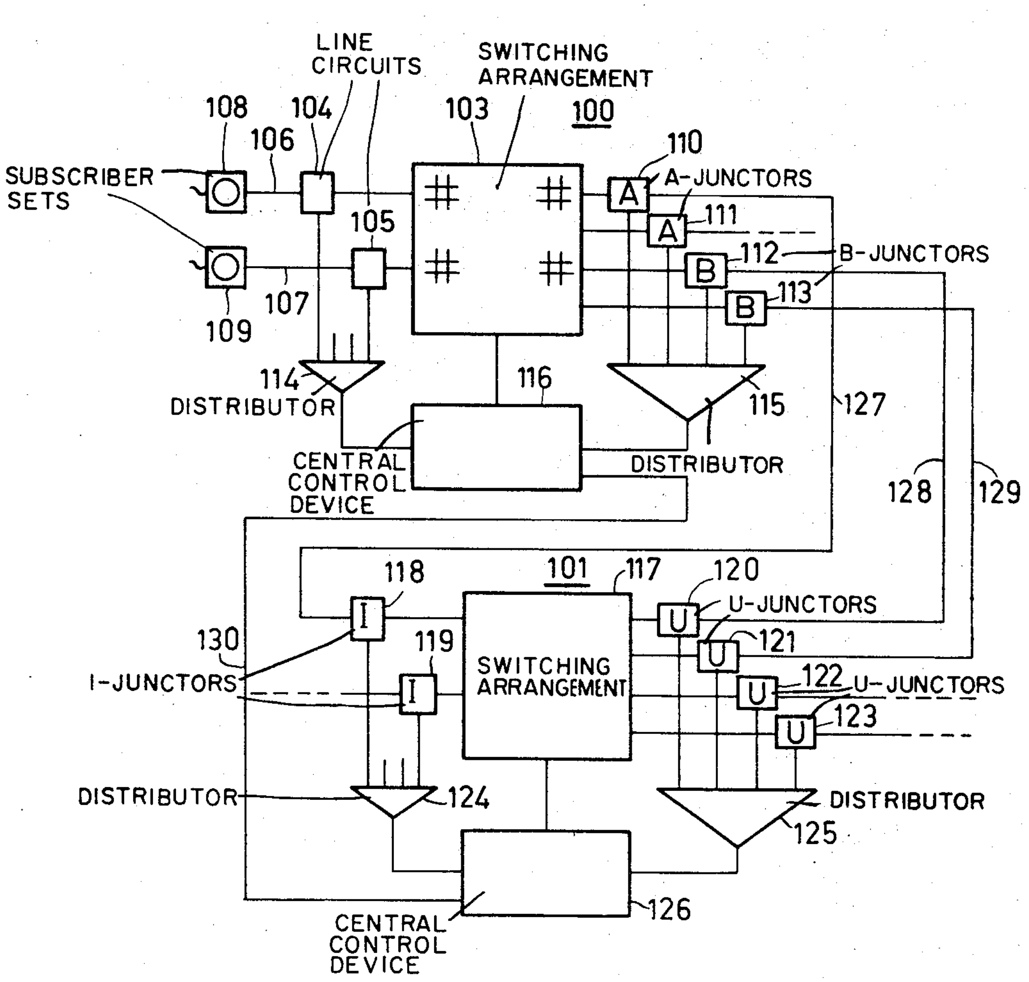

INVENTOR.
ROBERT B. BUCHNER
BY
AGENT

Patented April 24, 1973 3,729,592

2 Sheets-Sheet 2

INVENTOR.
ROBERT B. BUCHNER

BY

AGENT

TELECOMMUNICATION SYSTEM

The invention relates to a telecommunication system comprising a centrally controlled local exchange and a centrally controlled transit exchange, a group of junction lines connected to the local exchange and to the transit exchange, subscriber lines connected to the local exchange and trunk lines connected to the transit exchange. The local exchange comprises a switching arrangement to the inputs of which are connected the subscriber lines and to the outputs of which are connected the junction lines. The central control-device of the local exchange is arranged to establish connecting channels through the switching arrangement. The transit exchange comprises a switching arrangement, to the inputs of which are connected the junction lines and the trunk lines for the incoming traffic and to the outputs of which are connected the junction lines and the trunk lines for the outgoing traffic. The central control-device of the transit exchange is arranged to establish connecting channels through the switching arrangement.

Such systems are generally known; they are frequently termed concentrator systems. In such systems it is important for the number of crosspoints of the switching arrangement of the local exchange or concentrator to be as small as possible taking into account the maximum admissible blocking probability.

The invention has for its object to provide a reduction of the number of crosspoints of the concentrators without raising the probability of blocking and is based on the idea that in the present state of technology electronic transit exchanges using the time division multiplex principle and the pulse code modulation principle can be economically realized without or substantially without internal blocking.

The telecommunication system according to the invention is characterized in that the central control device of the local exchange is arranged, in the case of a call emanating from the transit exchange, for establishing a connecting channel between an arbitrary free junction line of said group and the subscriber line for which the call is intended and is arranged for transmitting the identification of the selected junction line to the transit exchange. The telecommunication system is further characterized in that the central control device of the transit exchange is arranged for receiving this identification and for establishing connecting channel from the junction line or trunk line connected to the transit from which the call emanates to the junction line whose identification has been received.

In this telecommunication system the provision of a choice from a plurality of junction lines for incoming calls provides an additional degree of freedom, that serves to reduce the number of crosspoints of the local exchange, without altering the probability of blocking.

The invention and its advantages will be described more fully with reference to the figures.

Therein

Figure 2:
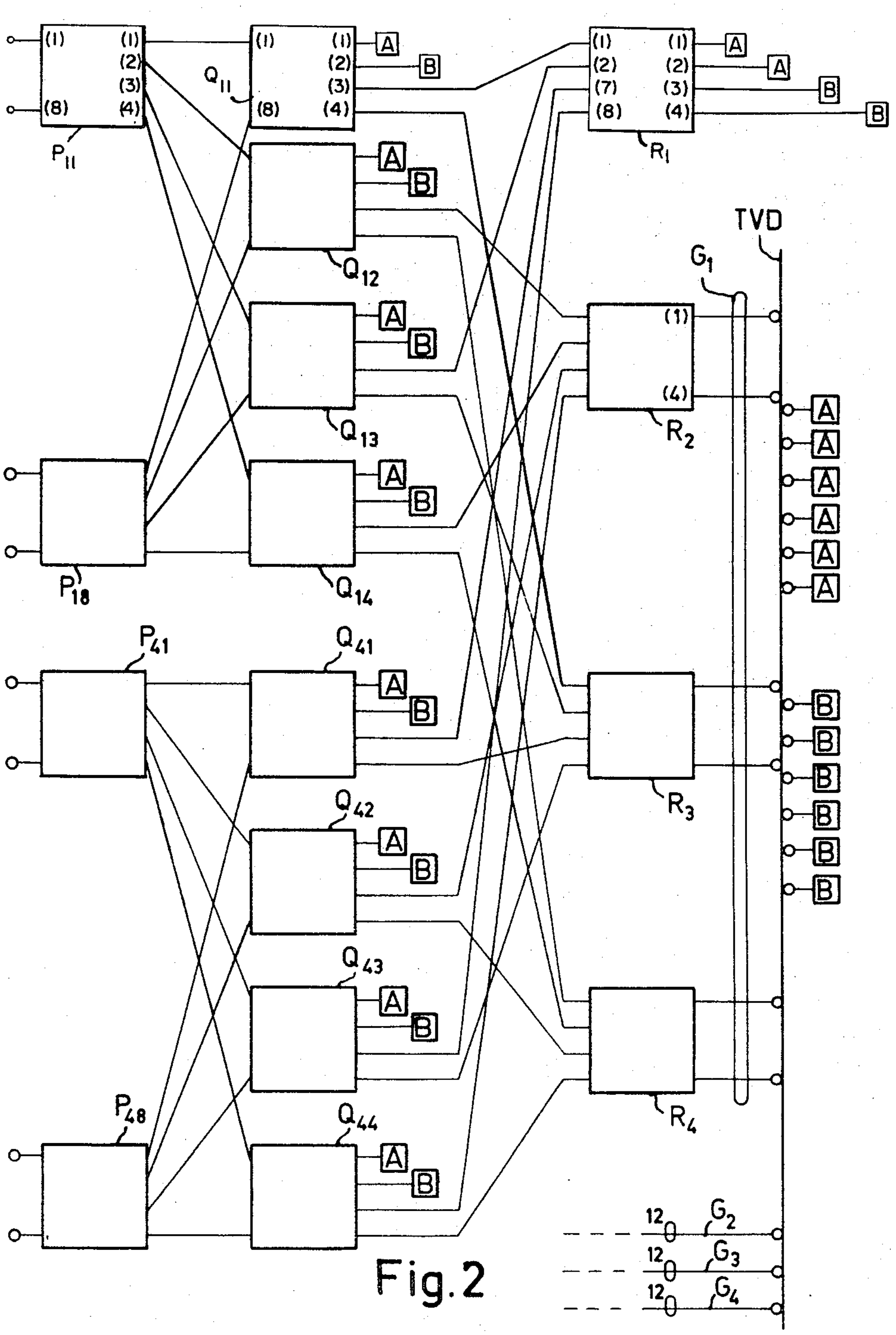

FIG. 1 shows schematically a telecommunication system embodying the invention and FIG. 2 the configuration of a switching arrangement suitable for use in the concentrator shown in FIG. 1.

FIG. 1 shows schematically a concentrator 100 and a transit exchange 101. The concentrator 100 comprises a switching arrangement 103, the inputs of which are connected the line circuits 104 and 105. These line circuits form the connections of the subscriber lines 106 and 107, to which the subscriber sets 108 and 109 are connected. To the outputs of the switching arrangement 103 are connected the A-junctors 110 and 111 for the outgoing traffic and the B-junctors 112 and 113 for the incoming traffic. The line circuits 104 and 105 are connected to a distributor 114 and the A- and B-junctors 110, 113 are connected to a distributor 115. The distributors 114 and 115 and the switching arrangement 103 are controlled by a central control-device 116.

The transit exchange 101 comprises a switching arrangement 117, to the inputs of which are connected I-junctors 118 and 119 for the incoming traffic. To the outputs of switching arrangement 117 are connected the U-junctors 120, 121, 122 and 123 for the outgoing traffic. The I-junctors are connected to a distributor 124 and the U-junctors are connected to a distributor 125. The distributors 124 and 125 and the switching arrangement 117 are controlled by a central control-device 126.

The A-junctor 110 of concentrator 100 is connected through a junction line 127 to the I-junctor 118 of the transit exchange 101. The U-junctors 120 and 121 of the latter are connected through the junction lines 128 and 129 to the B-junctors 112 and 113 of the concentrator 100. The line 127 is used for communication from the concentrator to the transit exchange and the lines 128 and 129 are used for the communications in the reverse direction.

The junction line connected to the A-junctors 111 as shown in broken lines in the Figure connects the concentrator 100 to a further transit exchange (not shown) or to the transit exchange 101. The trunk lines (indicated by broken lines) connected to the I-junctor 119 and to the U-junctors 122 and 123 connect the transit exchange to other transit exchanges and/or to other concentrators.

FIG. 1 illustrates the basic construction of a concentrator and a transit exchange as used in practice and are well known as such.

It should be understood that neither the number of subscriber lines connected to concentrator 100 nor the number of junction lines or trunk lines connected to concentrator 100 and transit exchange 101 is representative of the numbers which may occur in practice.

If a call comes in at the I-junctor 119 of transit exchange 101, it is accepted by the central control-device 126 through the distributor 124. Through the same connection the selection (dial) information is received. If the call is intended for a subscriber of the concentrator 100, the central control-device 126 selects a free U-junctor of a line to concentrator 100, for example, the U-junctor 120. The central control-device subsequently sets up through the switching arrangement 117 a connecting channel between the I-junctor 119 and the U-junctor 120. In the concentrator 100 the call is accepted by the central control-device 116 via the distributor 115. Through this connection the central control-device receives the selection information indicating the number of the subscriber called. The central control-device 116 subsequently tests via the distributor 114 whether the line circuit of the called subscriber is free. If the call is intended for a subscriber set 108, the central control-device tests the line circuit 104.

When the line circuit of the called subscriber is free, the central control-device 116 is ordered, in accordance with the known state of technology, to establish through the switching arrangement 103 a connecting channel between the B-junctor, in this example, 112 through which the call is received, and the line circuit, in this example 104, of the subscriber for whom the call is intended. In the case of an outgoing call of a subscriber the procedure is quite different. In the latter case the central control-device has to establish a connecting channel between the line circuit of the calling subscriber and an arbitrary free A-junctor. Consequently, in the event of an incoming call a given input of the switching arrangement has to be connected to a given output and in the event of an outgoing call a given input of the switching arrangement has to be connected to an arbitrary free output of a group of outputs. The latter group is formed by all outputs to which the A-junctors of the lines to the desired transit exchange are connected. In the event of an outgoing call a selection between a plurality of junction lines may be made; in the event of an incoming call the junction line is already determined.

In the selection method termed "conjugated selection" a connecting channel between an input and an output of a switching network is established by making a selection from all possible free connecting channels. It is also known in this case to find first an output accessible via at least one free connecting channel from the input, if an arbitrary output of a group of outputs forms the terminal point of a connecting channel. By using this selection method a switching network having a reduced number of crosspoints can be employed, without altering the probability of blocking remains the same.

The central control-device of concentrator 100, in the known state of technology, has, with an incoming call, a task differing from that in the event of an outgoing call. With the incoming call the probability of not finding a free connecting channel is greater than in the event of an outgoing call, in which case a selection can be made from a plurality of outputs. The switching network has to be proportioned so that at the most for a given percentage of incoming calls internal blocking occurs. The percentage of outgoing calls, at which internal blocking occurs, is considerably lower than the percentage of incoming calls at which internal blocking occurs.

The use of the principle of time-division multiplex and of pulse code modulation (PCM) in conjunction with the technique of integrated circuits enables an economic use of transit exchanges, which are free of internal blocking or which have a very slight internal blocking as compared with conventional exchanges. The use of these principles in a concentrator is still hindered by various factors, which will not be dealt with further in this specification. Provisionally there is still a need for concentrators having electromechanical coupling devices, for example, minature cross-bar switches or "dry reed" relay switches. It is therefore important to reduce further, if possible, the number of crosspoints of a concentrator.

The invention contemplates the use of a transit exchange being wholly or substantially wholly free of internal blocking and proposes to treat, in principle, calls received in the concentrator in the same manner as outgoing calls. A signalling channel is used, which is represented in FIG. 1 by line 130 between the central control-device 116 of concentrator 100 and the central control-device 126 of transit exchange 101. This signalling channel may be a separate channel; it is also possible to utilize the signalling facilities already available between the concentrator and the transit exchange. These facilities may be formed by line- or channel-bound signalling channels or by a common signalling channel.

In order to explain the manner in which concentrator 100 deals with an incoming call it is assumed by way of example that a call comes in at the B-junctor 112. It is furthermore assumed that the B-junctors 112 and 113 form part of a group of B-transmitters, which are all connected to lines from transit exchange 101. The lines 128 and 129 then form part of a bundle of lines connecting the transit exchange 101 to the concentrator 100. After the central control-device 116 has tested the line circuit of the called subscriber and has found it to be free, the central control-device selects from the group of B-junctors, to which the B-junctor 112 belongs, a free B-junctor which is accessible at least through one free connecting channel from the line circuit of the called subscriber. The central control-device then forms a connecting channel between the line circuit of the called subscriber and the selected B-junctor, for example, B 113. The B-junctor 112 may also have been chosen, if it is accessible for the line circuit. At any rate the central control-device 116 transfers via the signalling channel 130 the number of the B-junctor through which the call is received and the number of the B-junctor selected to the central control-device 126 of transit exchange 101. The central control-device 126 then changes over the terminal point of the connection starting from the I-junctor through which the call has come in, from the U-junctor 120 to the U-junctor in this example 121, which corresponds with the B-junctor selected by the central control-device 116, in this example 113. If the central control-device 116 selects the B-junctor, in this example 112, through which the call is received, the central control-device 126 of the transit exchange 101, subsequent to the reception of the signals from the central control-device 116 of concentrator 100, will maintain the connection between the I-junctor, through which the call is received, and the U-junctor through which the call is transmitted, in this example, 120.

The central control-device 116 of concentrator 100 selects, for an incoming call, one of a group of B-junctors so that the probability of not finding a free connecting channel is smaller than in the case in which only the B-junctor through which the call is received enters into account. In the transit exchange, if it is free of blocking or if it has only a very slight probability of internal blocking, a I-junctor may be connected to any free U-junctor. The change-over of the terminal point of a connecting channel from the U-junctor through which a call is transmitted to another U-junctor can then always be carried out.

The arrangement of the central control-devices 116 and 126 so that they can perform the functions described lies within the scope of those skilled in the art. The selection of a free B-junctor at the reception of an incoming call, which junctor is accessible from a desired input, may be carried out in the same manner as the selection of a free A-junctor for an outgoing call in the known state of the art local exchange. For signalling the number of the B-junctor, through which the call is received and the number of the selected B-junctor the signalling facilities already available may be utilized. The change-over of connections from one terminal point to another terminal point is one of the conventional facilities of private telephone exchanges. This technique may be used in a similar manner in a transit exchange.

FIG. 2 shows the configuration of a switching network suitable for use in a concentrator, in which the above-mentioned principle is carried into effect. This is the configuration of a group of 256 subscribers with a fundamental traffic of 4.5 to 5.0 Erlang per 100, divided into four groups of 64 subscribers. For each group of 64 subscribers eight switches of 8 × 4 are provided in a first switching stage and four switches of 8 × 4 in a second switching stage. For the $i^{th}$ group of 64 subscribers ($i = 1, \ldots 4$) these are in the first switching stage the switches $Pi_1, \ldots Pi_8$ and in the second switching stage the switches $Qi_1 \ldots Qi_4$.

FIG. 2 only shows the switches of the first and the fourth groups of 64 subscribers and only the first and the eight switches of each group (P).

Each switch P of each group of 64 subscribers is connected through an intermediate line to a separate input of a switch Q of the same group of 64 subscribers. To the outputs (1) of the switches Q are connected A-junctors and to the outputs (2) of the same switches are connected B-junctors.

For the group of 256 subscribers a third switching stage comprises four switches of 8 × 4. These are switches $R_1$, $R_2$, $R_3$ and $R_4$. The outputs (3) and (4) of each switch Q are connected through intermediate lines to separate inputs of different switches R. From each group of 64 subscribers two intermediate lines lead to each switch R from different switches Q. FIG. 2 only shows the intermediate lines from the first and fourth group of 64 subscribers. To the inputs (1) and (2) of switch $R_1$ are connected A-junctors and to the outputs (3) and (4) of the same switch are connected B-junctors.

The outputs (1) and (4) of the switches $R_2$, $R_3$ and $R_4$, which together form the group $G_1$, are connected to an intermediate distributor TVD which covers several groups of 256 subscribers, for example, four groups. The groups of outputs of the switches $R_2$, $R_3$, $R_4$ of the other three groups of 256 subscribers of FIG. 2 corresponding with the group $G_1$ of the shown group of 256 subscribers are designated by $G_2$, $G_3$ and $G_4$. These groups are also connected to the intermediate distributor TVD. To the outputs of the intermediate distributor TVD are connected six A-junctors and six B-junctors. In the intermediate distributor TVD the 48 outputs of the groups $G_1 \ldots G_4$ are multipled in known manner among the 12 junctors such that a satisfactory distribution of the traffic among the junctors is obtained.

For a group of 4 × 256 = 1,024 subscribers according to FIG. 2 there are accessible (16 × 4 + 4 × 2 + 6) = 78 A-junctors and 78 B-junctors.

For finding a free connecting channel through the switching network of FIG. 2 the following method is used. It is first tested whether one of the free junctors of the switches Q of the relevant group of 64 subscribers is accessible from the desired input. If this is not the case, it is tested whether one of the free junctors of the switch $R_1$ of the relevant group of 256 subscribers is accessible and if not, it is tested whether one of the free junctors of the intermediate distributor TVD of the relevant group of 1,024 subscribers is accessible. The traffic of a group of 64 subscribers then passes primarily through the transmitters of the switches Q. The transmitters of the switch $R_1$ take up the overflow traffic of the junctors of the switches Q of the four groups of 64 subscribers. The junctors of the intermediate distributor TVD take up the overflow traffic of the junctors of the switch $R_1$ of the four groups of 256 subscribers.

A switching network in the configuration of FIG. 2 comprises 6.5 crosspoints for each subscriber. By way of comparison it may be stated that concentrators in accordance with the present state of the out require switching networks comprising at least nine crosspoints for each subscriber in order to attain the same traffic capacity.

What is claimed is:

1. A telecommunication system, comprising a centrally controlled local exchange, a centrally controlled transit exchange, a group of junction lines connecting the local exchange to the transit exchange, subscriber lines connected to the local exchange, trunk lines connected to the transit exchange the local exchange comprising switching arrangement means connected to the subscriber lines and the junction lines for interconnecting a selected subscriber line with a selected junction line, a central control device in the local exchange for directing the switching device to interconnect selected subscriber lines to the transit exchange through selected junction lines, a second switching arrangement means in the transit exchange for connecting selected trunk lines to selected junction lines, a second central control device in the transit exchange for influencing the second switching arrangement to make the connections between the selected trunk and junction lines, means connected to the trunk lines for receiving a call identifying a subscriber line, means for transmitting the identification of the subscriber line to the first central control device, the first central control device further comprising means responsive to the receipt of subscriber line identification for establishing a connection through the first switching arrangement between the identified subscriber line and an arbitrary junction line, means in the local exchange for transmitting the identification of the selected junction line to the second central control device of the transit exchange, and means in the second central control device for establishing a connection through the second switching arrangement between the identified junction line and the trunk line on which the call identifying the subscriber line was received.

* * * * *